July 15, 1958  J. W. DUGAN  2,843,066
APPLICATOR FOOT FOR SOIL TREATMENT WITH AMMONIA
Filed May 16, 1956
Fig. 1
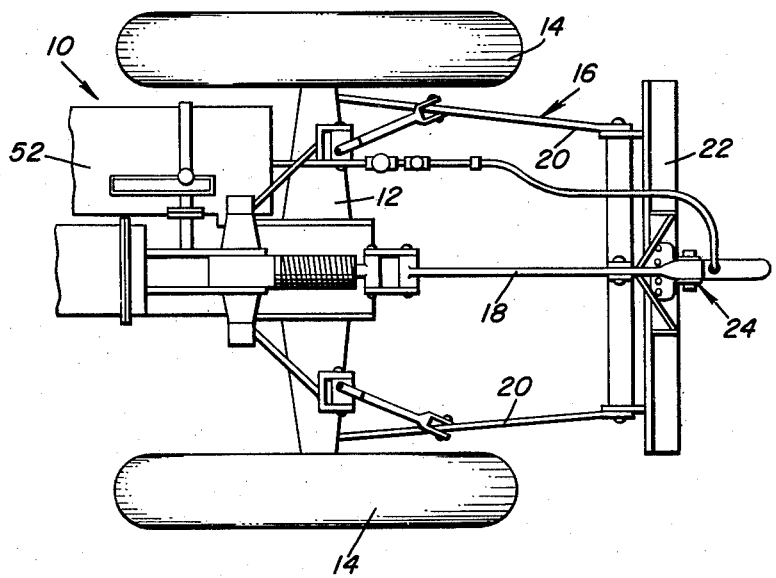
Fig. 2
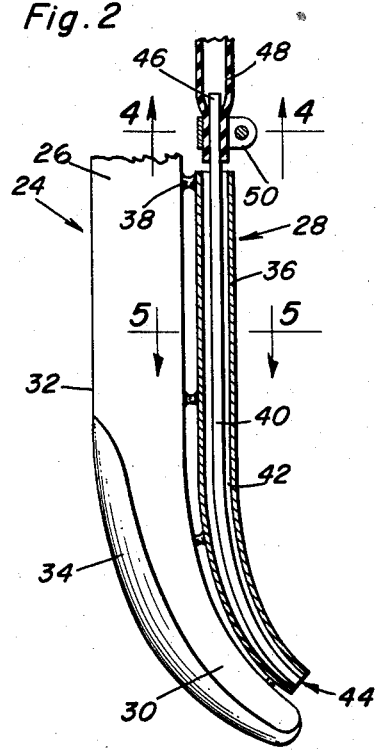
Fig. 3
Fig. 4
Fig. 5
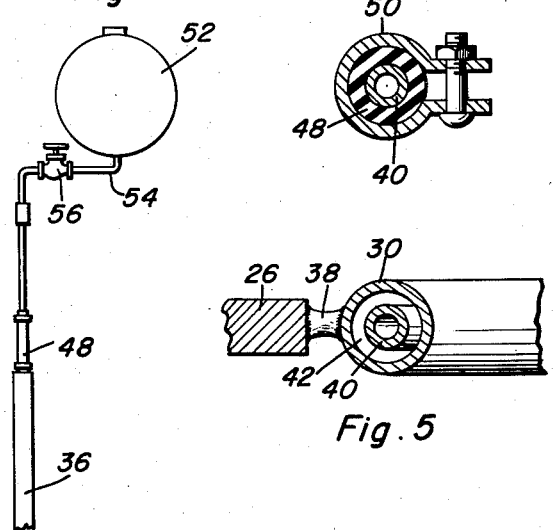
John W. Dugan
INVENTOR.
BY United States Patent Office 2,843,066
Patented July 15, 1958

2,843,066

APPLICATOR FOOT FOR SOIL TREATMENT WITH AMMONIA

John W. Dugan, Houma, La., assignor to Flo-Mix Fertilizers Corporation, Houma, La., a corporation of Delaware Application May 16, 1956, Serial No. 585,201

4 Claims. (Cl. 111—7)

This is a continuation-in-part of my earlier application Serial No. 344,435, filed March 24, 1953, now abandoned.

This invention relates to the treatment of soil by introducing fluids into the subsoil and it has for its object an arrangement which permits a continuous introduction of ammonia, especially in the form of anhydrous ammonia or in any form or condition in which vapors are developed in quantity.

The introduction of ammonia using mainly aquaammonia has been proposed and has already been practiced for many years. However the introduction of ammonia in some other form into the subsoil entails a number of difficulties which are connected with the absorption of the ammonia and with the avoiding of heavy losses during and after the introduction.

In order to introduce the ammonia into the subsoil it must be delivered through a pipe connected with a cultivator blade cutting the soil, such an arrangement being usually termed an applicator foot. The cultivator blade cuts a furrow of a certain depth, near the bottom of which the ammonia is discharged. When anhydrous ammonia is used the furrow must be closed immediately after the discharge of the ammonia into it to prevent the ammonia vapors from escaping and from being lost. Where vapors develop in quantity as in the event of using anhydrous ammonia the retaining of the vapors in the soil is an indispensable condition, as otherwise losses would be so heavy that the economy of the operation may be endangered.

In such a system, as will be clear, displaced soil comes continuously into contact with the discharge tube for the ammonia during the operation and this fact causes a further major difficulty. The ammonia vapor evaporating from the ammonia is at a somewhat higher pressure in the tube leading to the discharge end of the applicator than the atmospheric pressure. Therefore, upon discharge the vapors expand, said expansion producing a continuous cooling of the tube section from which the discharge takes place. The tube discharging the ammonia and the parts in contact therewith are thus permanently subjected to cooling so that they reach a subfreezing temperature. Further, the tube gets continuously into contact with displaced soil particles during the operation. These particles agglomerate, and if wet, the water adhering to them freezes. Even if soil particles should be dry the cooling produces sufficient condensation of atmospheric water to make them agglomerate by freezing, such agglomeration attaching itself to the cold tube. This causes what is called a "balling up" effect or an agglomeration of soil particles around and on the tube forming a solid frozen body which impedes the proper function of the applicator foot by impeding motion, preventing the closing of the furrow, and closing the outlet end of the tube so as to prevent further discharge. As soon as this "balling up" of the soil has reached a certain extent, it is therefore necessary to stop the advance of the vehicle carrying the applicator foot and to clean it again.

Obviously the effect is especially marked when lower atmospheric temperatures prevail or when the soil is wet or, in general, when conditions promoting the said "balling up" by freezing are prevalent.

Much disadvantage therefore results from this freezing effect practically under all conditions. Under the above stated especially unfavorable conditions the disadvantage caused by the "balling up" is so marked that it practically prevents a continuous injection of a vapor developing form of ammonia through an applicator foot, as the "balling up" proceeds so rapidly that the frequency of the cleaning periods and the time necessary for cleaning prevent any continuity of operation and frequently prevent any economically justified type of operation. This failure to operate successively with anhydrous ammonia leads to the introduction of nitrogen by means of a fluid which does not develop vapors but which is also much less effective from a biochemical point of view.

The deleterious effect caused by the expansion of the ammonia vapors cannot be stopped by mere insulation of the tube. The space is obviously limited and air insulation, for example, would be quite ineffective on account of the relatively small volume of air which may form the insulating layer around the discharge tube. This air would soon adopt a temperature which no longer prevents condensation of water and freezing of the soil particles coming into contact with such an insulating layer.

The primary object of the invention is thus to provide means for practically eliminating or materially reducing the "balling up" effect due to the agglomeration of soil particles around the applicator foot, thus making it possible to carry out a continuous ammonia injecting process even under unfavorable conditions which otherwise would exclude the use of vapor developing fluids.

According to the invention the ammonia conducting tube conveying the ammonia to the point of injection into the subsoil is surrounded by a vapor collecting jacket into which the vapors developed by the ammonia can penetrate after discharge from the conveying tube. The vapors dissolve in the water of condensation which forms around the discharge tube and in the space between the jacket and the tube. The dissolution of the vapors in water produces solution heat, as is well known. Thus, by virtue of this solution by the vapors in the water aquaammonia is formed which has a very low freezing point so that it can drain continuously into the soil even at low temperatures.

The constant production of heat within the jacket due to the solution of the vapors and the constant drainage of the solution keeps the temperature around the jacket at a level which is above freezing temperature thus counteracting the cooling which is produced by the expansion of the vapor.

The object of the invention may thus be characterized as an attempt to subject the vapors of anhydrous ammonia or of other fluids developing vapors in quantity in successive stages to conditions producing opposite thermic effects, with the result that these thermic effects essentially neutralize each other either partly or completely.

A further object of the invention consists in providing an applicator foot or apparatus adapted to realize the object above mentioned which is of simple construction and which requires very little modification of the type of applicator foot now in use, so that the presently existing equipment can be used for the application of liquid anhydrous ammonia to the soil.

Further objects and features of the invention will become apparent in the following detailed specification.

The invention is illustrated by way of example in the accompanying drawing. It is however to be understood that the embodiment of the invention which is illustrated by way of example intends essentially to permit a full explanation of the principle of the invention and of the best mode of applying said principle. It will be clear from the above explanation that the apparatus used for realizing the principle, as explained, may be modified in many ways and therefore a departure from the embodiment of the invention which has been illustrated is not necessarily a departure from the principle of the invention.

In the drawing:

Figure 1 is a plan view of the rear portion of a tractor to which an applicator foot has been applied, Figure 2 is an elevational side view of the applicator foot partly in section, Figure 3 is a diagrammatic view of the flow system by means of which liquid anhydrous ammonia may flow from a tank provided on the tractor through the applicator tube, Figure 4 is a cross-sectional view of a detail the section being taken along line 4—4 of Figure 2, Figure 5 is a cross-sectional plan view on an enlarged scale of a portion of an applicator foot, the section being taken substantially along line 5—5 of Figure 2.

Figure 1 of the accompanying drawings shows the rear portion of a tractor 10, or of a cultivator or any other vehicle adapted for agricultural operation which is provided with a rear axle housing 12 journaling the axle of the rear wheels 14 and with a power driven lift assembly indicated at 16 which extends rearwardly from the said axle housing.

The lift assembly 16 includes a central compression arm 18 and lateral lift arms 20 on opposite sides of the compression arm. At the rear end of the lift assembly a tool bar 22 of the conventional type is arranged which extends transversely with respect to the direction of movement of the tractor.

An applicator foot 24 is secured to and depending from the tool bar 22. Only a single applicator foot 24 is illustrated in the accompanying drawing which is secured to the central portion of the tool bar 22, but it is to be understood that a plurality of applicator feet may be arranged which are spaced along the tool bar 22 to form an assembly or gang.

The construction of the applicator foot 24, illustrated in detail in Figure 2, follows in general conventional lines. This construction comprises a cultivator blade 26 or plow foot and an ammonia applicator arranged behind the trailing edge of the said cultivator blade said ammonia applicator being indicated at 28. The cultivating blade 26 constitutes an elongated bar-like member the leading edge of which is forwardly directed pointing in the direction of movement of the tractor while its lower end portion 30 is curved rearwardly. The leading edge 32 of the said lower end portion of the cultivator blade 26 is formed as a cutting edge 34 for penetrating the soil and producing a furrow, exposing the subsurface of the soil for the application of the ammonia. The ammonia applicator 28 connected with the said blade comprises an ammonia conduit tube 40 which, according to the invention, is surrounded by an outer vapor collecting jacket 36 which is secured at spaced points throughout its length to the trailing edge of the cultivator blade 26 in any suitable manner. In the embodiment illustrated, this jacket or tube 36 is welded at spaced points 38 to the trailing edge of the blade 26. The inner tube 40 is shown as being concentrically disposed within the outer tube 36. Between the said inner tube, the outer diameter of which is smaller than the inner diameter of the vapor collecting jacket 36, an annular space 42 is provided substantially throughout the whole length of the jacket 36. The tube 40 is preferably somewhat bendable or deformable to permit its insertion into the jacket 36 throughout the entire length of the jacket. Preferably the jacket 36 and the inner tube 40 follow the curvature of the cultivating blade 26, so that the orifice of the ammonia conducting tube 40 is downwardly and rearwardly directed.

The inner tube 40 consists of any suitable material that is not subject to corrosion or deterioration by the action of ammonia.

The outlet end 44 of the ammonia conducting tube 40 terminates within but adjacent to the lower end of the jacket 36 and is located somewhat above the rearwardly bent portion of the cultivator blade 26. The upper end portion 46 of the inner tube 40 preferably projects above the upper end of the jacket 36, and this end is joined to a flexible hose or conduit 48 which receives the said upper end portion 46 of the inner tube 40 and is frictionally clamped thereto by means of a suitable clamp 50 as illustrated in Figure 4.

The inner tube 40 may or may not depend for its support within the jacket 36 on its connection with the flexible conduit 48 by means of the clamp 50. It may also be supported within the jacket 36 by reason of its deformability; such support is provided by the fact that when the lower portion of the inner tube 40 is forced through the jacket 36 and is bent accordingly it will then seat itself against a point of the inner wall of the jacket 36.

A container 52 for the liquid anhydrous ammonia is mounted on the tractor or cultivator in any suitable manner, and a suitable conduit 54 provided with pressure regulating means 56 for regulating the flow of the liquid anhydrous ammonia through the conduit is connected with the said container. The free end of the conduit 54 is secured to the forward end of the flexible conduit 48, the lower end of which is in its turn secured to the upper end portion 46 of the inner tube 40 of the ammonia applicator 28.

The operation of the system for dispensing the liquid anhydrous ammonia by means of the applicator 28 by the tube 40 will be clear from the preceding description. When the tractor or other vehicle is moved, the cultivator blade 26 cuts a furrow into the soil to the desired depth and during this operation the liquid anhydrous ammonia flows from the container 52 through the tube 54, the flow being regulated by the valve or other regulating means 56. The liquid ammonia by means of the hose 48 reaches the tube 40 and flows through the tube into the subsoil at the outlet end 44 which is located slightly above the lower end of the curved portion of the cultivator blade 26.

When the anhydrous ammonia is discharged through the end 44 of the inner tube 40 the vapors which have formed and which are under the same pressure as the liquid, a pressure which is higher than the outer air pressure, reach the atmosphere where they expand, such expansion, as well known, being accompanied by a cooling effect.

In order to prevent this cooling effect causing a "balling up" as described above, during which the moisture inherent in or collected by the soil particles is frozen and thus acts as a fixation agent causing agglomeration of the particles on and around the cooled parts, the vapor collecting jacket 36 is provided which produces an air space 42 surrounding the ammonia dispensing tube 40. The cooling of the inner tube due to the expansion of the vapors produces a condenstaion of atmospheric water along the tube within said space 42, while simultaneously the ammonia vapors penetrate into the space enclosed by the jacket. These ammonia vapors now reach the water and go into solution, forming aquaammonia. This solution process goes on rapidly and energetically owing to the great affinity of the ammonia for water.

As well known this process of solution produces solution heat which thus counteracts the cooling produced by the expansion of the vapors. The vapors being thus subjected to two different processes occurring in succession, the one absorbing heat and the other developing heat, are thus unable to cool the tube sufficiently below the freezing point of water, to produce freezing of the soil and a "balling-up" effect as this point could only be reached by a continuous and unchecked cooling effect. The developing of an unchecked cooling due to the negative thermic effect of a vapor expansion is thus prevented by the positive thermic process of ammonia solution which goes on in the space between the inner tube 40 and the vapor collecting jacket 36. The formation of a subfreezing temperature on the outside of the jacket 36 which is now no longer exposed to any continuous cooling effect or at least not to one which may not be overcome by its exposure to the atmosphere is thus prevented.

The solution of the ammonia vapors in water which is formed within the space 42 and especially on the tube 40 is not subject to freezing, even if a freezing temperature would develop, because aquaammonia has a freezing point which is very low (−107° C.). Thus the solution which has also fertilizing properties flows along the walls of the space 42 into the soil.

No subfreezing temperature can thus develop along the outer tube 36 under these circumstances and consequently no continuous wetting and freezing of condensed water takes place along the outer tube and thus the means for binding the soil particles, causing them to adhere to each other and to the surface of the outer tube are absent. The "balling up" effect is thus suppressed and a substantially continuous application of anhydrous ammonia to the soil is possible.

The practical benefits derived by the present invention applied to the art of anhydrous ammonia fertilization are seen to be considerable. They will manifest themselves under all conditions and will be of special advantage when climatic and soil conditions are unfavorable.

What is claimed as new is as follows:

1. In an applicator foot for the subsurface application of anhydrous ammonia to the soil of the type including a cultivating blade and an ammonia applicator carried thereby, the improvement comprising a tubular sleeve carried by said cultivator blade, an ammonia injection tube arranged within said sleeve and spaced therefrom, thus producing a sleeve enclosed chamber surrounding said ammonia injection tube communicating with the outer air at both ends, the lower end portions of said sleeve and said ammonia injection tube terminating substantially in the same plane in which a central discharge opening and a surrounding annular passage are thus located, the upper end portion of the ammonia injection tube projecting above the upper end of the sleeve, a flexible ammonia conducting conduit connected with said upper end of the ammonia injection tube, the ammonia vapors, leaving at the lower end of the ammonia injection tube and expanding while leaving, producing a cooling effect condensing atmospheric moisture along the ammonia injection tube, and the ammonia vapors penetrating into the chamber between the sleeve and the ammonia injection tube through the annular passage surrounding the central discharge opening dissolve in the condensed moisture and produce solution heat, counteracting the cooling effect produced by the expansion of the ammonia and thus preventing the freezing of the soil particles and of the moisture contained therein by contact with the permanently cooled ammonia injection tube.

2. Injection means for injecting anhydrous ammonia into the soil below the soil surface, comprising a plow foot penetrating into the soil, an ammonia injection tube disposed to the rear of the same for injecting anhydrous ammonia into the soil subsurface at its discharge end, means preventing the development of temperatures sufficiently low to produce freezing of the soil around the injection means, said means including a sleeve supported by said plow foot, spaced from and surrounding said ammonia injection tube, open towards the atmosphere to admit outer air, the moisture content of which condenses along the cooled ammonia injection tube, the end portion of said sleeve surrounding the discharge end of the ammonia injection tube so that ammonia vapors penetrate into the space between the sleeve and the ammonia injection tube, said vapors dissolving in the water formed by condensation of moisture from the air, thus producing heat, said sleeve thus preventing contact between the cooled ammonia injection tube and the soil, contact with the soil occurring only along the sleeve surrounding the ammonia injection tube, the temperature of which sleeve has been raised by the solution heat.

3. A protective device for subsurface injection means of anhydrous ammonia as claimed in claim 2, wherein the tubular sleeve substantially concentrically surrounding the ammonia tube is open at both ends, its lower end being arranged closely to, slightly in front of and surrounding the discharge end of the ammonia injection tube, so as to form an annular passage collecting some of the ammonia vapors issuing through the discharge end of the ammonia injection tube.

4. An applicator foot for the subsurface application of anhydrous ammonia to the soil comprising a cultivator blade, an ammonia injection tube injecting ammonia into the subsoil, arranged near the trailing edge of the cultivator blade, a protective tubular jacket for said ammonia injection tube, fixed to the cultivator blade, spaced from and surrounding the ammonia injection tube, an annular chamber being formed between the ammonia injection tube and the surrounding tubular jacket, said jacket being open at both ends, one end being open towards the atmosphere while the other open end substantially surrounds the discharge end of the ammonia injection tube, the lower ends of said ammonia injection tube and of said tubular protective jacket both terminating in close proximity to each other, with the tubular jacket projecting slightly beyond the end of the injection tube, the chamber surrounded by the tubular jacket thus collecting some of the anhydrous ammonia discharged at the discharge end of the ammonia injection tube, whereby the ammonia vapors leaving the ammonia injection tube and expanding while leaving cool and condense the moisture in the air circulating through the tubular jacket along the inner tube, and the ammonia vapors penetrating into the annular chamber between the ammonia injection tube and the jacket dissolve in the condensed moisture and produce solution heat counteracting the cooling effect produced by the expansion of ammonia, thus preventing the freezing of soil particles and of the moisture contained therein by contact with the permanently cooled ammonia injection tube.

References Cited in the file of this patent
UNITED STATES PATENTS

| 625,759 | Hargrave | May 30, 1899 |
| 2,660,939 | Pool et al. | Dec. 1, 1953 |
| 2,784,530 | Dugan | Mar. 12, 1957 |